Figure 1:
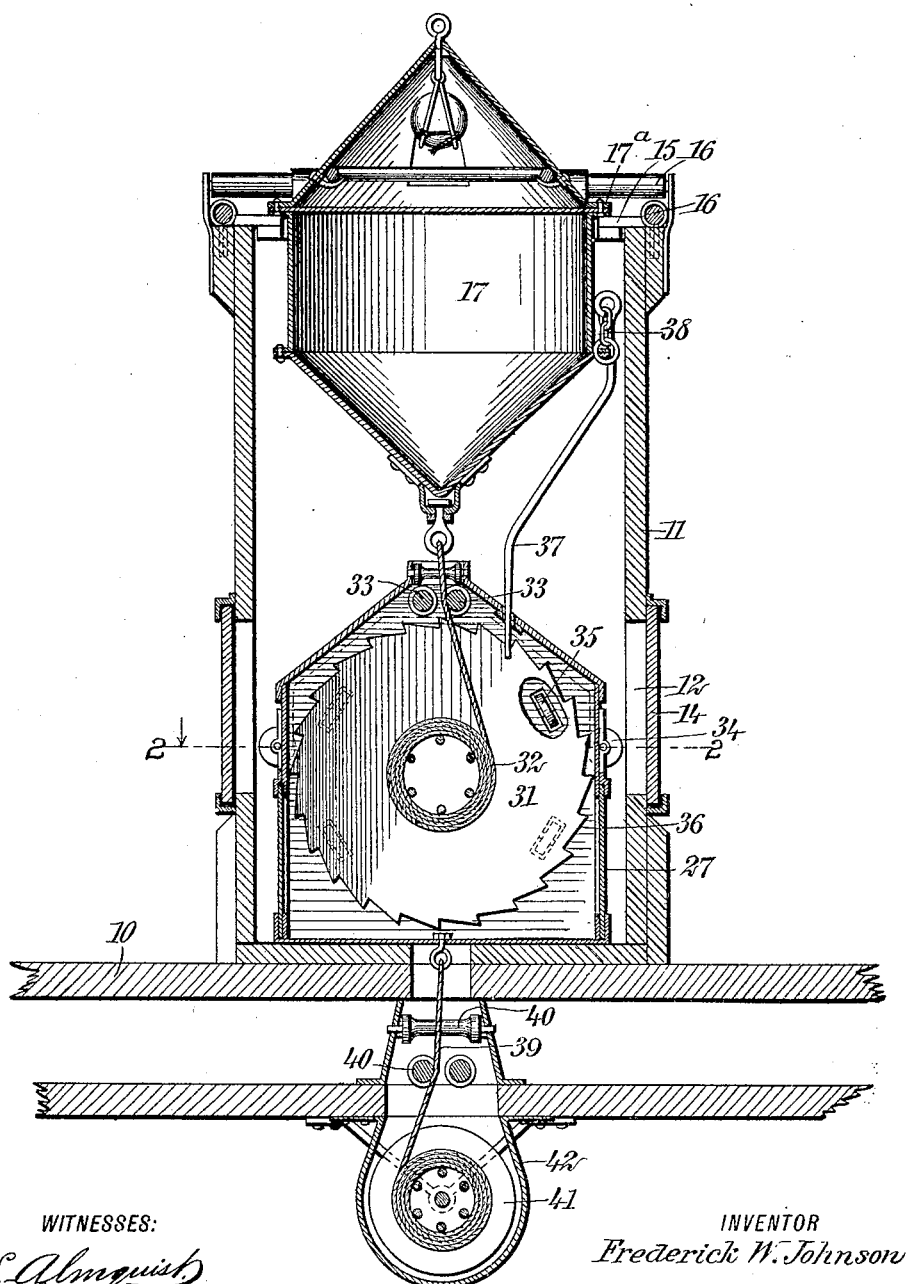

No. 814,536. PATENTED MAR. 6, 1906.
F. W. JOHNSON.
APPARATUS FOR MARKING SUNKEN VESSELS.
APPLICATION FILED JULY 18, 1905.

2 SHEETS—SHEET 1.

WITNESSES:
L. Almquist
Isaac B. Owens.

INVENTOR
Frederick W. Johnson
BY
ATTORNEYS

No. 814,536. PATENTED MAR. 6, 1906.
F. W. JOHNSON.
APPARATUS FOR MARKING SUNKEN VESSELS.
APPLICATION FILED JULY 18, 1905.
2 SHEETS—SHEET 2.
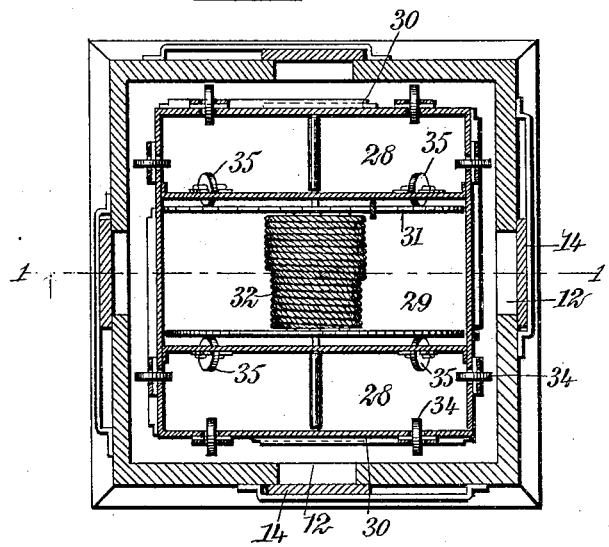
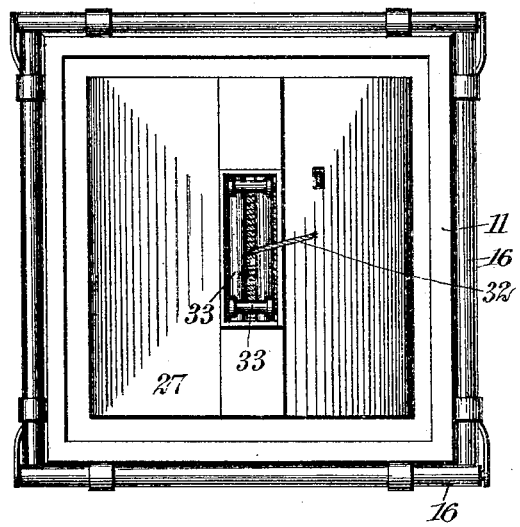
WITNESSES:
INVENTOR
Frederick W. Johnson
BY
ATTORNEYS

UNITED STATES PATENT OFFICE.

FREDERICK W. JOHNSON, OF DAWSON, CANADA, ASSIGNOR OF ONE-HALF TO JOHN P. PETERSON, OF DAWSON, CANADA.

APPARATUS FOR MARKING SUNKEN VESSELS.

No. 814,536.      Specification of Letters Patent.      Patented March 6, 1906.

Original application filed September 23, 1903, Serial No. 174,309. Divided and this application filed July 18, 1905. Serial No. 270,191.

*To all whom it may concern:*

Be it known that I, FREDERICK W. JOHNSON, a subject of the King of Great Britain, and a resident of Dawson, in the Yukon Territory, Dominion of Canada, have invented a new and Improved Apparatus for Marking Sunken Vessels, of which the following is a full, clear, and exact description.

The present application is a division of my application filed September 23, 1903, Serial No. 174,309, on which issued my patent dated March 28, 1905, No. 786,126.

The invention relates to a means for marking sunken vessels and for enabling the immediate recovery of the principal valuables of the ship—such, for example, as the ship's papers, specie, invoices, accounts, and other documents of the purser.

The apparatus comprises a buoy connected with the vessel to rise to the surface if the vessel sinks. The buoy as far as the present application is concerned may be of any desired form and is connected by means of a line with a reel arranged in a box or vault. The box or vault has compartments for the storage of the ship's valuables, as before explained, and this box is in turn connected to the vessel by means of a line for which a second reel permanently mounted on the vessel is provided. Should the vessel sink, the buoy will immediately rise to the surface, thus marking the wreck, and by hauling up on the buoy-line the vault may be raised to the surface. It will be observed that after the vault is raised the exact position of the wreck will still be marked by the second line, which connects the vault with the hull.

Reference is to be had to the accompanying drawings, which illustrate as an example the preferred embodiment of the invention, in which drawings like characters of reference indicate like parts in the several views, and in which—

Figure 1 is a sectional view showing the parts constituting the invention in position on the deck of the vessel, said view being in section on the line 1 1 of Fig. 2. Fig. 2 is a section on the line 2 2 of Fig. 1; and Fig. 3 is a plan view of the housing in which the various parts of the apparatus are contained, said view showing the box or vault within the housing.

10 in Fig. 1 indicates the deck of the vessel, and 11 a suitable housing which is built on the deck. Said housing is provided with door-openings 12, closed by doors 14. I prefer to arrange the housing 11 in that part of the deck-house occupied as the purser's office so that the purser may readily have access to the interior of the housing through the openings 12. The housing is provided with an orificed cover 15 on its top, this being merely rested on the housing and readily removed, and rollers 16 are mounted on the upper edge of the housing, so that the buoy-line may play easily over the same.

17 indicates the buoy, which, as before stated, may be of any desired form. The buoy is normally placed in the orifices in the cover 15 of the housing 11 and has an annular flange 17$^a$ loosely resting on said cover, as shown in Fig. 1.

27 indicates the safe or vault. This is preferably constructed of sheet metal and is provided, as best shown in Fig. 2, with two partitions, forming side compartments 28 and a middle compartment 29. The side compartments 28 are provided with doors 30, through which access may be had to the interior of the compartments. These compartments are intended to have the safe of the ship placed therein. The central compartment 29 carries a reel 31, on which is wound the buoy-line 32. Said line passes between guide-rollers 33 and through an opening in the top of the vault 27 and has swivel connection with the buoy 17, as shown.

34 indicates antifriction-rollers attached to the side of the vault to enable the vault to be readily drawn out of the housing 11, and 35 indicates similar rollers arranged to bear against the flanges of the reel 31. One of the flanges of the reel 31 is provided with ratchet-teeth 36, (shown best in Fig. 1,) and 37 indicates a forked rod straddling said flange and bearing against said ratchet-teeth to prevent unwinding of the reel during the engagement of the rod therewith. This rod is connected to the buoy 17 by shackles 38 and normally occupies the position shown in Fig. 1. When, however, the buoy rises, the rod 37 is disengaged from the ratchet-flange of the reel 31 and said reel is free to unwind.

The vault 27 has a line 39 connected with its bottom, this line passing through the deck of the vessel and between guide-rollers 40, placed in the deck and serving to prevent chafing of the line.

41 indicates a reel on which the line 39 is wound, and 42 indicates a stout casing inclosing the reel to prevent fouling the same should the vessel capsize after sinking and objects with the vessel be thrown against the reel.

In use the apparatus is placed on the deck of the vessel and the parts are adjusted, as shown in Fig. 1. Should the vessel sink, the buoy 17 will lift the cover 15 of the housing 11 and rise to the surface. Simultaneously the reel 31 will be released, permitting the line 32 to unwind. When the buoy is discovered, the line 32 may be hauled to the surface and the valuables of the ship recovered from the vault or safe 27. As said vault rises the line 39 will pay out from the reel 41 and will serve still to connect the sunken vessel with the surface.

Having thus described the preferred form of my invention, what I claim as new, and desire to secure by Letters Patent, is—

1. The combination with a vessel, of a buoy, a vault, a reel in the vault, a buoy-line connected to the buoy and to the reel, and a second line connecting the vault with the vessel.

2. The combination of a buoy, a vault, a reel in the vault, a buoy-line connecting the buoy and reel, a reel mounted on the vessel, and a line connecting the vault and the second-named reel.

3. The combination with the decks of a vessel, of a housing built thereon, a buoy, a vault capable of being contained within the housing, a reel within the vault, a line connecting the buoy and reel, a reel mounted on the vessel, and a line connecting the vault and the second-named reel.

4. The combination with a vessel, of a buoy, a vault, a line connecting the two, and a second line connecting the vault with the vessel.

5. The combination with a vessel, of a buoy, a vault, a line connecting the two, a second line connecting the vault with the vessel, and a housing mounted on the vessel and adapted normally to contain the vault and buoy.

6. The combination of a buoy, a reel, a line connecting the reel and buoy, and a restraining means for the reel, said restraining means being connected with the buoy.

7. The combination of a buoy, a reel having a ratcheted flange, a line connected with the buoy and wound over the reel, and a rod attached to the buoy and normally connected with the ratcheted flange of the reel.

In testimony whereof I have signed my name to this specification in the presence of two subscribing witnesses.

FREDERICK W. JOHNSON.

Witnesses:
 GEO. A. CONDOGEORGE,
 O. E. TOCHSTROM.